(12) United States Patent
Hunter

(10) Patent No.: US 9,456,022 B2
(45) Date of Patent: *Sep. 27, 2016

(54) AUTOMATIC ACCESS OF INTERNET CONTENT WITH A CAMERA-ENABLED CELL PHONE

(71) Applicant: NeoMedia Technologies, Inc., Boulder, CO (US)

(72) Inventor: Kevin D. Hunter, Fort Myers, FL (US)

(73) Assignee: NeoMedia Technologies, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/934,397

(22) Filed: Jul. 3, 2013

(65) Prior Publication Data

US 2014/0082134 A1    Mar. 20, 2014

Related U.S. Application Data

(63) Continuation of application No. 12/510,418, filed on Jul. 28, 2009, now abandoned, which is a continuation of application No. 12/054,507, filed on Mar. 25, 2008, now abandoned, which is a continuation of application No. 11/269,139, filed on Nov. 8, 2005, now Pat. No. 7,430,588, which is a continuation of application No. 10/863,580, filed on Jun. 7, 2004, now Pat. No. 6,993,574.

(60) Provisional application No. 60/476,496, filed on Jun. 6, 2003.

(51) Int. Cl.
G06F 15/16 (2006.01)
H04L 29/08 (2006.01)
G06F 17/30 (2006.01)

(52) U.S. Cl.
CPC ......... *H04L 67/06* (2013.01); *G06F 17/30879* (2013.01); *Y10S 707/99939* (2013.01)

(58) Field of Classification Search
CPC ............. H04L 67/06; G06F 17/30879; Y10S 707/99939
USPC .................................................. 709/217, 245
See application file for complete search history.

(56) References Cited

U.S. PATENT DOCUMENTS

2001/0047428 A1* 11/2001 Hunter .......................... 709/245

* cited by examiner

*Primary Examiner* — Yves Dalencourt

(57) ABSTRACT

A camera-enabled cell phone that is adapted to image a machine readable code such as a bar code, decode the bar code, send the bar code data over the Internet to a resolution server that will return an associated URL that will ink the camera phone to content on an information server. Thus, by taking a picture of a bar code symbol, the camera phone will automatically retrieve content from the Internet that has been linked to that bar code via the present invention.

12 Claims, 7 Drawing Sheets

AUTOMATIC ACCESS OF INTERNET CONTENT WITH A CAMERA-ENABLED CELL PHONE

BACKGROUND OF THE INVENTION

The present invention relates to wireless access of Internet content, in particular to the use of a portable camera/cell phone device for scanning bar codes and automatically downloading associated web content that is linked to the scanned bar code.

Systems exist in the prior art that allow a user to scan a bar code such as a product UPC code (or other machine-readable indicia), decode the bar code data, and send the decoded bar code data to an offsite server computer, where the server computer looks up a URL associated with that bar code in a database and sends the retrieved URL back to the user's computer. A browser at the user's computer then uses the URL to retrieve web content associated with the URL. This type of system, for example disclosed in U.S. Pat. Nos. 5,978,773 and 6,199,048 (owned by the assignee of the present invention, NeoMedia Technologies, Inc.), allows a user to automatically link to web content by simply scanning a bar code with a scanner attached to the user's PC. In another type of system, disclosed in U.S. Pat. No. 6,542,933, also owned by NeoMedia Technologies, Inc., a special bar code known as a PaperClick code is scanned, and the decoded data in parsed into two portions (a server ID and an item ID), with the server ID used to retrieve a URL template that is sent back to the user's PC, which then assembles a full URL by inserting the item ID from the bar code into the URL template, which is then used to retrieve the linked web content.

It is desired to be able to utilize this type of automatic web content retrieval system with portable devices that are not tethered to the user's PC. Such a portable device would allow a user to automatically access linked web content at any location, and not just when using his desktop PC. However, portable devices that can scan barcodes are not widely deployed. In addition, it is most convenient for the person scanning a PaperClick code or UPC code to be able to see the results immediately, even if they are not at their computer. A desired application for a portable device under this invention is for a user to enter a Barnes & Noble store, see a book he likes, scan the barcode on the back, and see what Amazon.com's price is, all without involving anything that one would normally consider a computer.

SUMMARY OF THE INVENTION

The present invention is a cellular telephone having an embedded or attachable camera and wireless Internet access capabilities, adapted to image a bar code symbol and retrieve related web content automatically, without the user being tethered to a desktop PC as in the prior art. The invention uses a camera phone adapted to perform the desired functions described herein. By adapting a camera phone in accordance with the invention, a consumer having such a camera phone can be provided with the value-added functionality of taking a picture of a bar code on a product, and having the camera phone automatically obtain information on the product, which may be for example prices from a search engine or sponsored web content.

The present invention utilizes a client program that operates a cell phone with a built-in camera and web browser. When the user activates the client on the camera phone, it provides a real-time on-screen display of what the camera is imaging. When the user presses the trigger, the camera phone grabs the image, uses an image-based decode algorithm to locate and decode a barcode, then invokes the built-in web browser, pointing it at a resolution server on the Internet with the barcode value it decoded. The resolution server takes the data sent from the camera phone and resolves the data into a URL in one of several ways, depending on the application (to be described later).

Thus, the present invention is a method for accessing content from an information server computer on a computer network such as the Internet using a camera-enabled cell phone. First, an image of a machine-readable code such as a bar code symbol is captured with the camera-enabled cell phone. The captured bar code image is processed to decode the bar code into a file identifier, and a request URL is formed that includes the file identifier. The request URL is then transmitted to a resolution server computer on the computer network. At the resolution server computer, an information URL is determined as a function of the request URL. The information URL is then returned to the camera-enabled cell phone, which in turn transmits the information URL to an information server computer designated by the information URL. The information server computer receives the information URL and returns content to the camera-enabled cell phone as a function of the information URL.

The request URL sent by the camera-enabled cell phone may optionally include a device identifier that serves to identify certain operating characteristics of the camera-enabled cell phone, such as the browser capabilities. In this case, the information URL will be determined as a function of the device identifier. This allows different information URLs to be returned for different devices, based on their display capabilities, so that each device will retrieve content that is optimized for display on that particular device.

The information URL may also be determined at the resolution server by extracting the file identifier from the request URL; and then querying a database with the file identifier. The resolution server database will have a plurality of mappings of file identifiers to associated information URLs.

In a further embodiment, the camera-enabled cell phone will capture an image of a machine-readable code with a camera-enabled cell phone and then process the captured image to decode the machine-readable code into a file identifier that contains a server ID and an item ID. A request URL is formed that includes the file identifier. The request URL is transmitted to a predetermined gateway server on the computer network, which analyzes the server ID to determine an associated resolution server on the computer network. The gateway server sends the item ID to the resolution server that is associated with the server ID to obtain an information URL as a function of the server ID and the item ID. The resolution server returns the information URL to the gateway server, and the gateway server interacts with the camera-enabled cell phone to send the information URL to an information server computer designated by the information URL and receive content from the information server computer as a function of the information URL.

In this embodiment, the gateway server interacts with the camera-enabled cell phone to send the information URL to an information server computer designated by the information URL and receive content from the information server computer as a function of the information URL in either of two ways. First, the gateway server may send the information URL to the information server computer designated by the information URL. The gateway server would then receive content from the information server computer as a function of the information URL and send the content received from the information server to the camera-enabled cell phone. Alternatively, the gateway server may send the information URL to the camera-enabled cell phone, and the camera-enabled cell phone then sends the information URL to the information server computer designated by the information URL. The camera-enabled cell phone then receives content from the information server computer as a function of the information URL.

In order to carry out this invention, the camera-enabled cell phone of the present invention includes a housing with a cellular telephone transceiver, a digital camera module having a camera lens, a display screen, and processing circuitry that interoperates with these components. In particular, the processing circuitry is adapted or programmed to cause the cellular telephone transceiver to selectively communicate with a cellular telephone network to place and receive cellular telephone calls, and to communicate with server computers via a browser program on a global computer network. The processing circuitry is also adapted to capture, via the digital camera module, an image of a machine-readable code, to process the captured image to decode the machine-readable code into a file identifier, to form a request URL comprising the file identifier and to transmit, via the cellular telephone transceiver, the request URL to a resolution server computer on the global computer network. The processing circuitry is also adapted to receive from the resolution server an information URL determined by the resolution server as a function of the request URL, interoperate with the browser program to transmit the information URL received from the resolution server to an information server computer designated by the information URL, receive content from the information server computer as a function of the information URL, and to display the received content on the display screen.

DETAILED DESCRIPTION OF THE INVENTION

Figure 1:
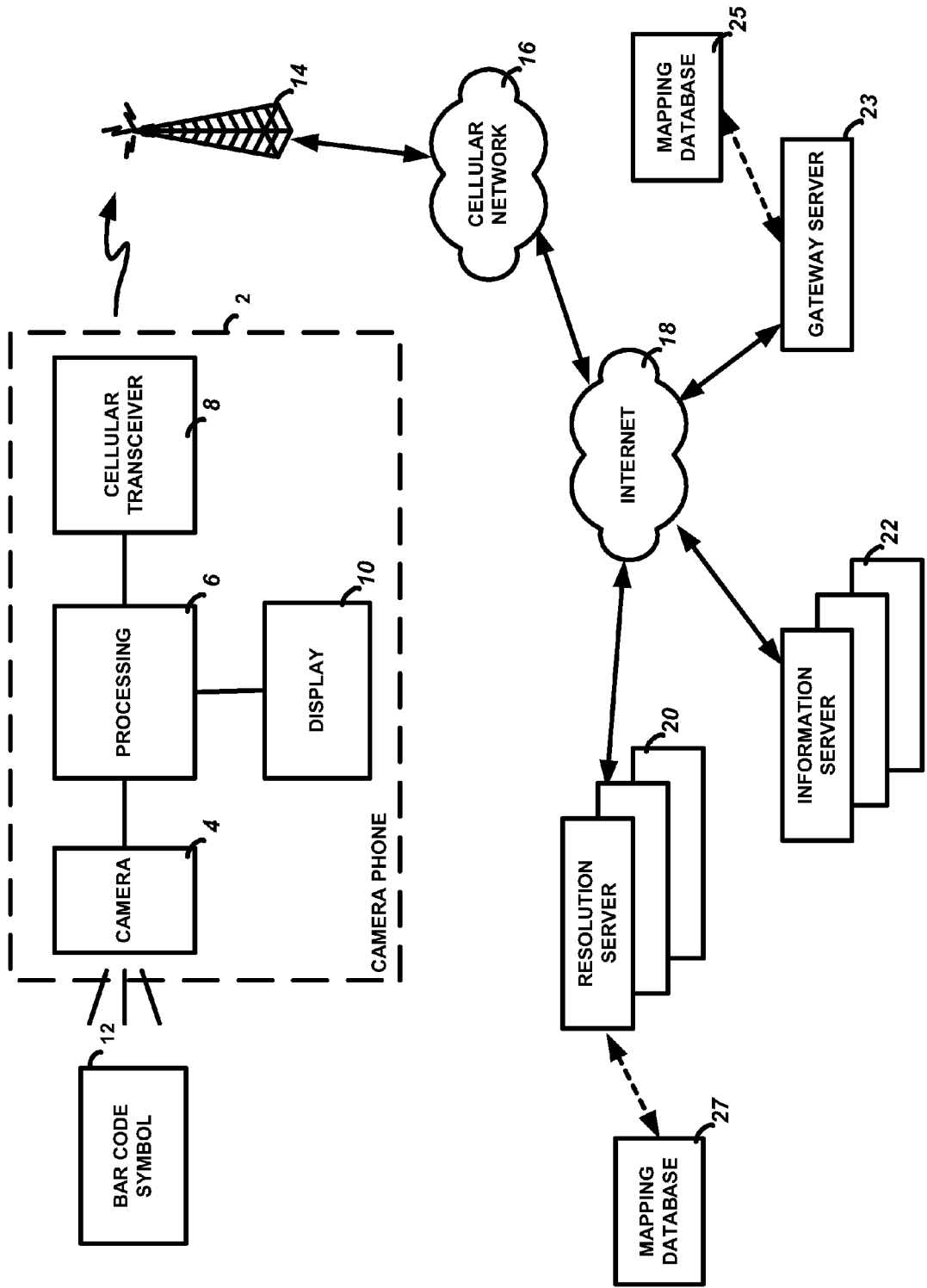
FIG. 1 shows a basic block diagram of the operation of the present invention.

FIG. 1 shows a basic block diagram of the operation of the present invention. A camera-enabled cell phone 2 (also referred to herein as a camera phone) includes, in one housing, a digital camera module 4, a display screen 10, a cellular telephone transceiver 8, processing circuitry 6, and various user input devices (such as keys, buttons, microphone, touchscreen display) as well as output devices (such as a speaker) not shown for the purpose of clarity but well known in the art of cell phones. It is noted that although the preferred embodiment described herein utilizes an integrated camera phone (i.e. a cell phone with a built-in camera), the present invention is also intended to operate with a cell phone having an attachable camera, e.g. via an input/output port, as well. Likewise, any device that utilizes the functionality of a cellular or wireless phone and an imaging device such as a digital camera is covered by this invention as well.

A user invokes the appropriate client application on the phone (described below), and then images (takes a picture of), with the camera 4, the target bar code symbol 12 or other machine readable code. The processing circuitry 6 decodes the bar code image obtained by the camera 4 and generates a request, typically in the form of a request URL having all or part of the decoded bar code integrated therewith, for sending out via the cell phone's wireless transceiver 8. This is typically done via a wireless Internet connection as known in the art.

The request URL is sent wirelessly via a local antenna 14, through the cellular network 16 and the Internet 18, to the destination server, which is referred to as a resolution server 20. The resolution server 20 accepts the request URL and parses out the bar code data from it. The resolution server 20 then looks up the bar code data on a mapping database 27 and retrieves an associated information URL, which is then sent back to the camera phone 2 and handed to a web browser program, which is then redirected by the information URL to the appropriate information server 22 on the Internet. The content requested by the information URL is sent from the information server 22 to the browser on the camera phone 2 and displayed thereon for the user. Thus, by invoking the appropriate client software on the phone 2 as described herein, the user can image or take a picture of a bar code and have content driven to his display 10 that is associated with that bar code 12.

Various methodologies are known in the art that control how the bar code symbol is used to retrieve content from the Internet. In the basic case mentioned above, there is a simple mapping function carried out by the resolution server 20, which takes the decoded bar code data and looks up a preprogrammed information URL in its database 27. This is shown, for example, in U.S. Pat. No. 5,978,773, which is incorporated by reference herein. In an alternative embodiment, the bar code may be parsed into a server ID and an item ID, as taught in U.S. Pat. No. 6,542,933, which is incorporated by reference herein. Moreover, the content returned to the camera phone 2 may be specifically tailored for display on the small display of that device. This may be accomplished by using a methodology referred to as device-specific profiled routing, in which the request URL is assembled by the camera phone based on an additional parameter that is a device identification code, which designates if that client device is a wireless device that supports, for example, WML content, or XHTML content. By signaling to the resolution server 20 that the requesting device is WAP compliant, then the information URL sent to the camera phone will redirect its browser to an appropriate web site with WML content (wherein if the same bar code were used to request content via a full screen monitor on a desktop, the full HTML page would be returned). This device based profile routing is fully described in U.S. application Ser. No. 09/821,535, DEVICE-BASED ROUTING FOR WEB CONTENT RETRIEVAL, owned by the assignee of the present invention, the specification of which is incorporated by reference herein.

In an alternative embodiment, another server computer referred to as a gateway server 23 is utilized. The gateway server 23 acts essentially as a proxy server that receives request URLs from the camera phone, processes these requests, and returns either the information URL in a redirect to the camera phone browser or the information server content directly to the browser without requiring a redirect at the camera phone. In this embodiment, the bar code symbol is a file identifier that includes a server ID and an item ID as previously mentioned. The server ID will identify which resolution server will contain the specific mapping of item IDs to information URLs. In this scenario, there will be more than one (and likely many) resolution servers employed so as they distribute the database and computing requirements amongst many computers. This also has the advantage of allowing multiple parties to have control over various resolution servers instead of one party controlling one large resolution server.

In this embodiment, the request URL contains the server ID and the item ID, and is sent to a gateway server computer 23. Each and every request URL sent by the camera phone will be sent to the same gateway server computer 23 (the address is essentially hard coded into the client application running on the camera phone). The gateway server 23 receives the request URL from the camera phone and parses out or extracts the server ID. The gateway server 23 then analyzes the server ID to determine which resolution server on the computer network is identified thereby (e.g. by reference to a database 25). The gateway server then sends the item ID to the resolution server 20 identified by the server ID. The resolution server 20 receives the item ID and performs a lookup of the item ID to retrieve an associated information URL from memory. That is, the resolution server will prepare and an information URL that indicates where the requested information may be found. The resolution server then returns the information URL to the gateway server 23.

The gateway server then interoperates with the camera phone in one of two ways, depending on how the system is configured, to provide the information content at the camera phone. In one embodiment, the gateway server sends the information URL to the information server, receives the content from the information server computer as a function of the information URL, and sends the content received from the information server to the camera-enabled cell phone.

In an alternative embodiment, the gateway server hands off the information URL to the camera phone, the camera phone sends the information URL to the information server computer, and then the camera phone receives the content directly from the information server computer as a function of the information URL.

One problem with camera phones available today is that they are fixed focus, meaning that the phone is adapted to take pictures at "normal" distances, i.e. several feet out to infinity. Unfortunately, this means that pictures taken close (~3 inches) are badly blurred. To be able to decode the bar code symbol from the captured image data, however, the camera cell phone must be placed very close to the bar code (e.g. approximately 2-5 inches), otherwise the bars and spaces in the barcode are too fine for the camera imager, and the bar code cannot be properly decoded.

As shown in the Figures, a convex lens may be added to the camera with a focal length near the desired distance of about 3 inches. Two types of lens attachments have been developed for use in this invention. The first embodiment (see FIGS. 8-12) has a set of "fingers" that wrap around the cell phone, allowing the lens to be clipped on on so that it is fastened to the phone and over the lens of the camera. In this manner, the bar codes may be captured with the lens add-on attached, and it may still be removed so the camera phone may be used normally.

Figure 2:
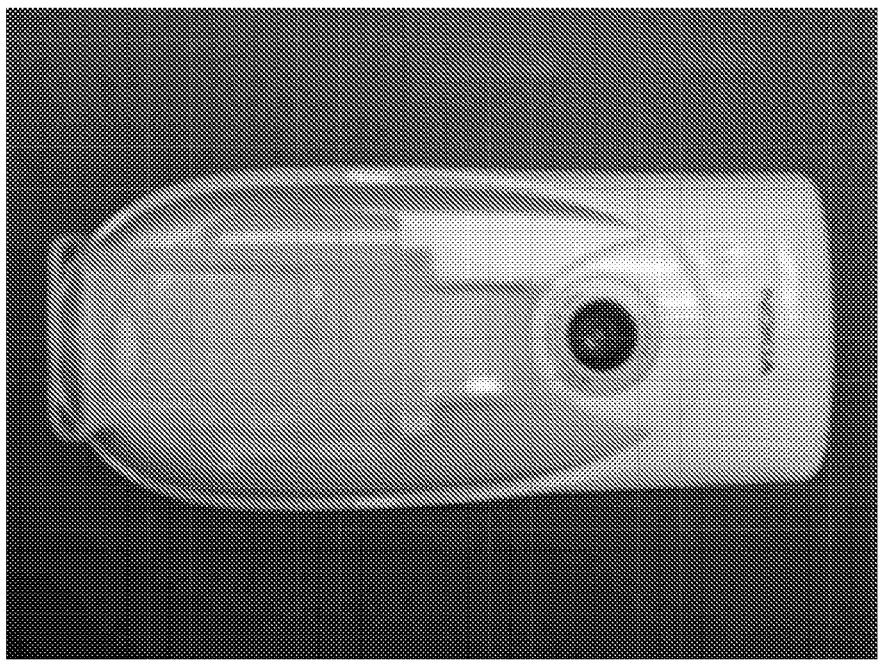
FIGS. 2-7 show an embodiment of the lens adapter of the present invention.
Figure 3:
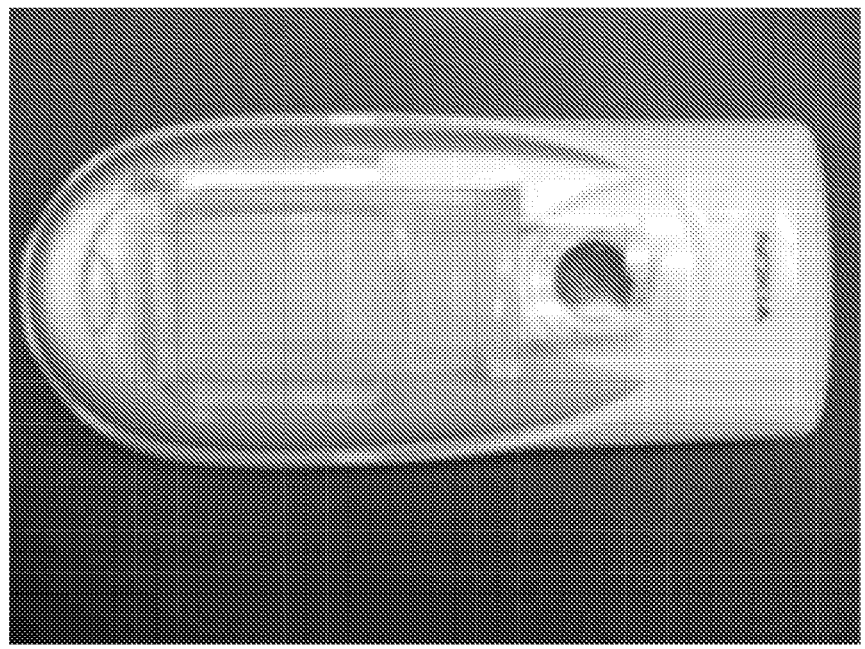
Figure 4:
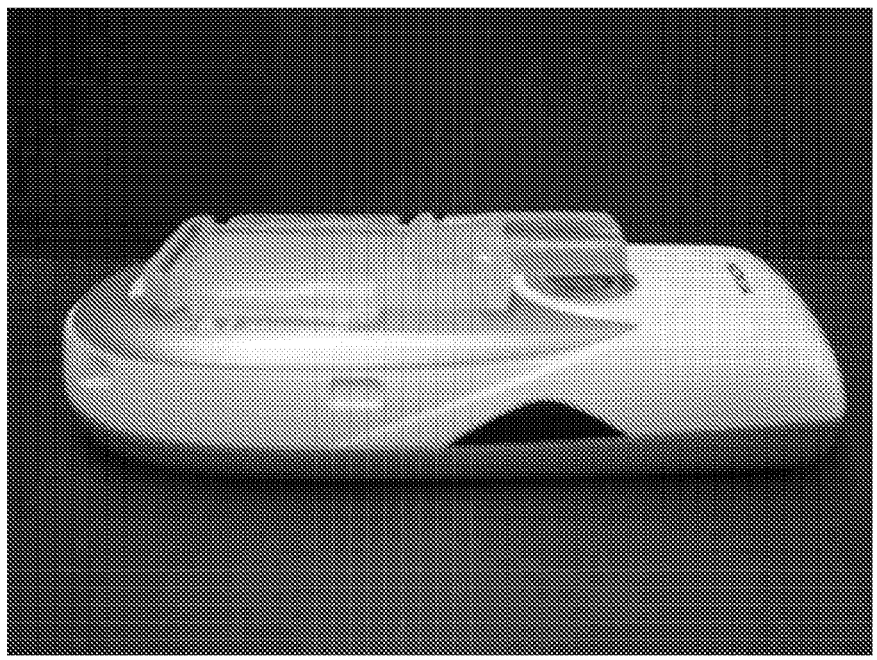
Figure 5:
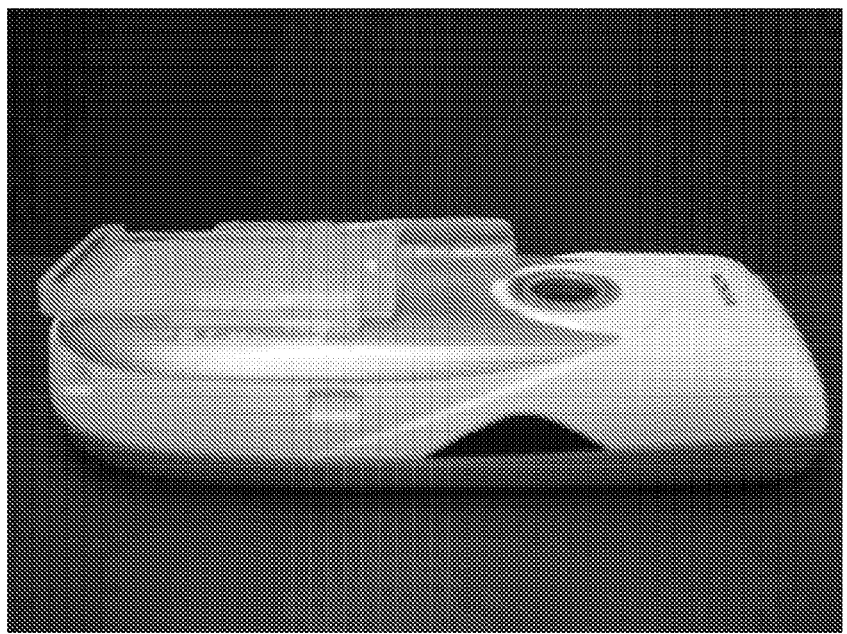
Figure 6:
Figure 7:
Figure 8:
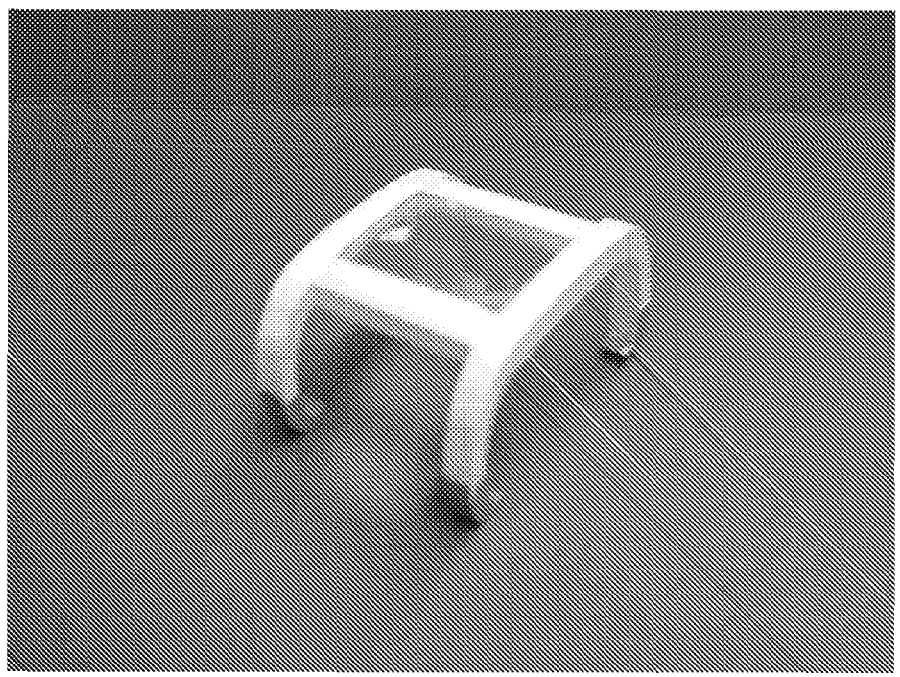
FIGS. 8-12 show an alternative embodiment of the lens adapter of the present invention.
Figure 9:
Figure 10:
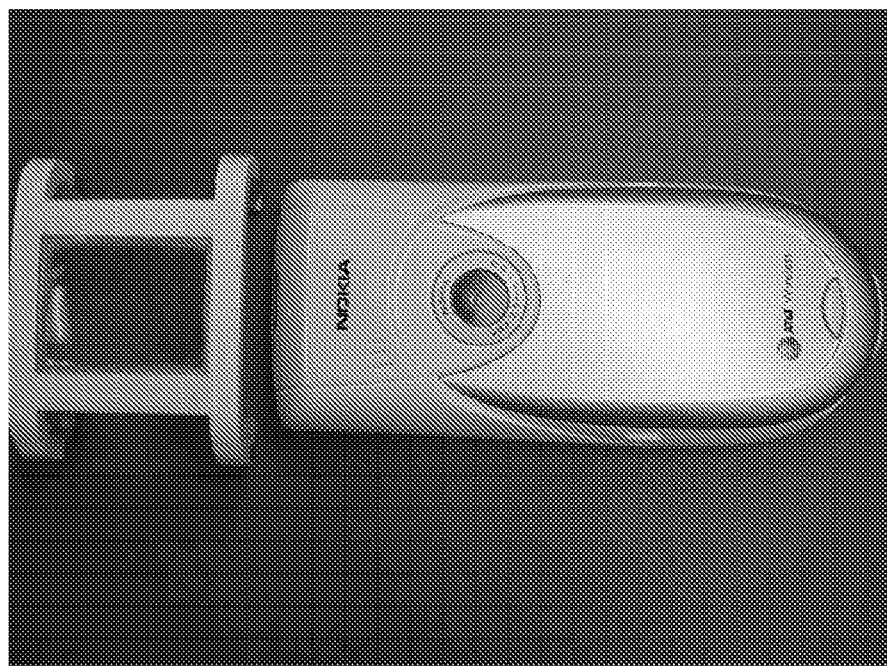
Figure 11:
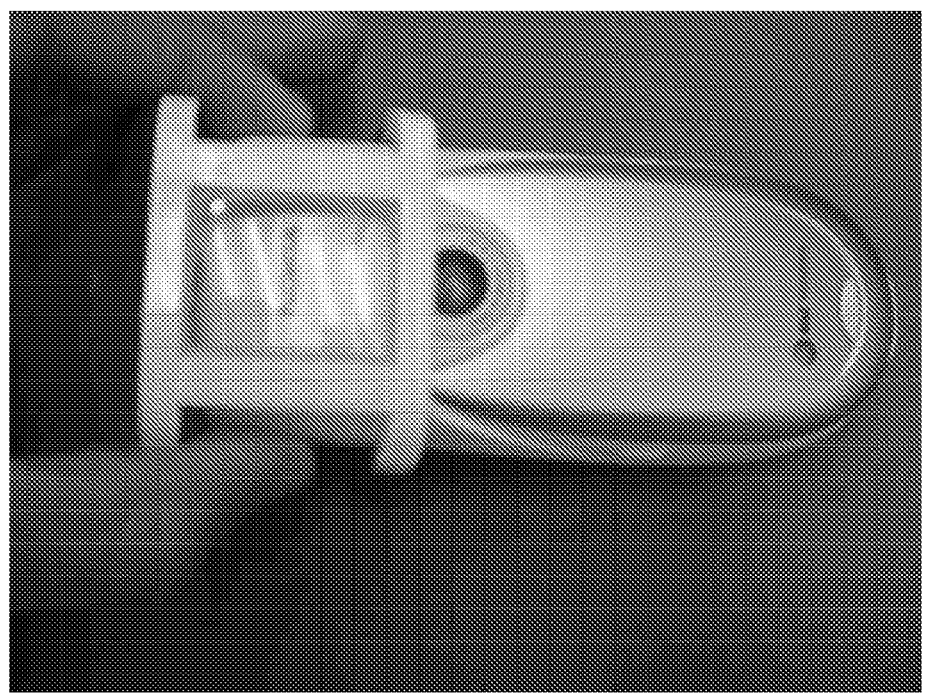
Figure 12:
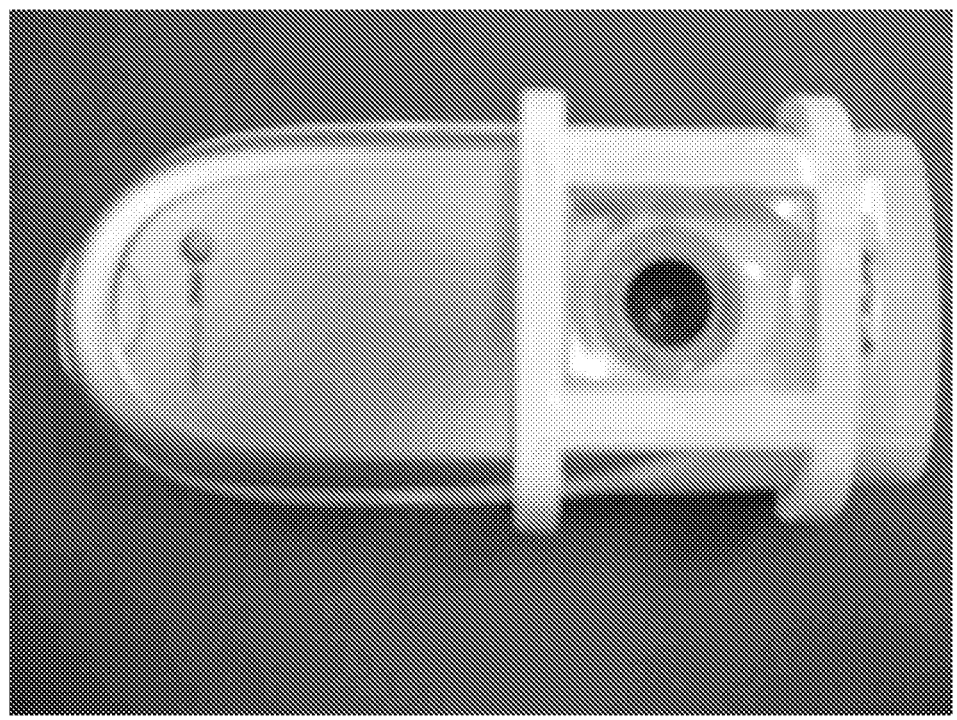

A second embodiment is shown in FIGS. 2-7 and is attached to the back cover of the camera. This embodiment allows the lens to be slid up into place over the camera lens, and then slid back out of the way. FIG. 2 shows a bottom view of the camera phone with this add on attachment in its retracted state, and FIG. 3 shows a bottom view of the camera phone with this add on attachment in its extended state. FIG. 5 shows a side view of the camera phone with this add on attachment in its retracted state, and FIG. 4 shows a side view of the camera phone with this add on attachment in its extended state. FIG. 6 shows a perspective view of the camera phone with this add on attachment in its retracted state, and FIG. 7 shows a perspective view of the camera phone with this add on attachment in its extended state.

In addition, in order to assist the user to locate the bar code at the optimal distance from the camera phone, the real-time screen display includes index markers on the screen, which basically mark the corners of a rectangle. The index markers are used to assess how close to hold the camera phone to the bar code for optimum focus by causing the barcode to fit within the index markers. Since UPC codes are almost always a standard size, and since PAPERCLICK proprietary codes are a standard height, fitting the bar code to the rectangle places the bar code at a specific distance from the phone. In practice, the distance may be varied about +/- one inch without significant degradation, but this use of index markers aides the user in placing the bar code at about the center of the field of view for optimal focusing.

I claim:

1. A system for accessing content from an information server computer on a computer network comprising:
    A) a portable wireless integrated device comprising:
        a. a wireless transceiver;
        b. an image capture module;
        c. a display screen; and
        d. processing circuitry programmed to:
            i. cause the wireless transceiver to selectively communicate with a wireless network to transmit and receive wireless messages, and to communicate with server computers on a global computer network;
            ii. capture, via the image capture module, an image of a machine-readable code;
            iii. process the captured image to decode the machine-readable code into a file identifier comprising a server ID and an item ID;
            iv. form a data request message comprising the file identifier;
            v. transmit, via the wireless transceiver, the data request message to a gateway server computer on the global computer network;
            vi. receive content from the gateway server computer as a function of the data message request; and
            vii. display at least part of the received content on the display screen; and
    B) a gateway server computer interconnected to the global computer network and in communication with the portable wireless integrated device, the gateway server computer programmed to:
        i. use the file identifier to obtain from a resolution server computer an information URL associated with the file identifier by
            analyzing the server ID of the file identifier to determine an associated resolution server computer on the computer network; and
            sending the item ID of the file identifier to the resolution server computer on the computer network that is associated with the server ID ;
        ii. send the information URL to an information server computer designated by the information URL;
        iii. receive content from the information server computer as a function of the information URL; and
        iv. send the content to the portable wireless integrated device; and C) a resolution server computer interconnected to the global computer network and in communication with the gateway server computer, the resolution server computer programmed to return the information URL to the gateway server computer on request of the gateway server computer by
obtaining the information URL as a function of the server ID and the item ID; and
returning the information URL to the gateway server computer.

2. The system of claim 1 wherein the processing circuitry of the portable wireless device processes the captured image to decode the machine-readable code into a file identifier by decoding a bar code symbol which is the machine readable code.

3. The system of claim 1 wherein the image capture module is a camera.

4. The system of claim 1 wherein the data request message comprises a URL.

5. A method for accessing content from an information server computer on a computer network comprising the steps of:
 a. capturing an image of a machine-readable code with a portable wireless integrated device;
 b. processing, on the portable wireless integrated device, the captured image to decode the machine-readable code into a file identifier comprising a server ID and an item ID;
 c. forming, on the portable wireless integrated device, a data request message comprising the file identifier;
 d. transmitting, from the portable wireless integrated device via an associated wireless communications network, the data request message to a gateway server computer on the computer network that is interoperable with the wireless communications network;
 e. the gateway server computer using the file identifier to obtain from a resolution server computer an information URL associated with the file identifier by
  i. analyzing the server ID of the file identifier to determine an associated resolution server computer on the computer network;
  ii. sending the item ID of the file identifier to the resolution server computer on the computer network that is associated with the server ID; and
  iii. receiving the information URL obtained as a function of the item ID from the resolution server computer;
 f. the gateway server computer sending the information URL to an information server computer designated by the information URL;
 g. the gateway server computer receiving content from the information server computer as a function of the information URL;
 h. the gateway server computer sending the content to the portable wireless integrated device; and
 i. displaying at least part of the returned content on a display of the portable wireless integrated device.

6. The method of claim 5 wherein the machine-readable code is a bar code symbol.

7. The method of claim 5 wherein the image is captured with a camera on the portable wireless integrated device.

8. The method of claim 5 wherein the data request message comprises a URL.

9. A system for accessing content from an information server computer on a computer network comprising:
 A) a portable wireless device comprising:
  e. a wireless transceiver;
  f. input means for reading a machine readable code and for providing code data from the machine readable code; and
  g. processing circuitry programmed to:
   i. cause the wireless transceiver to selectively communicate with a wireless network to transmit and receive wireless messages, and to communicate with server computers on a computer network;
   ii. receive code data from the input means;
   iii. process the code data to generate a file identifier comprising a server ID and an item ID;
   iv. form a data request message comprising the file identifier;
   v. transmit, via the wireless transceiver, the data request message to a gateway server computer on the computer network;
   vi. receive an information URL from the gateway server computer as a function of the data request message;
   vii. send the information URL to an information server computer designated by the information URL;
   viii. receive content from the information server computer as a function of the information URL; and
   ix. perform a function with respect to the received content; and
 B) a gateway server computer interconnected to the computer network and in communication with the portable wireless device, the gateway server computer programmed to:
  i. use the file identifier to obtain from a resolution server computer an information URL associated with the file identifier by sending the item ID of the file identifier to the resolution server computer on the computer network that is associated with the server ID; and
  ii. send the information URL to the portable wireless integrated device; and
 C) a resolution server computer interconnected to the computer network and in communication with the gateway server computer, the resolution server computer programmed to return the information URL to the gateway server computer on request of the gateway server computer by obtaining the information URL as a function of the item ID;
 and returning the information URL to the gateway server computer.

10. The system of claim 9 wherein the processing circuitry of the portable wireless device processes the code data to generate a file identifier by decoding a bar code symbol which is the machine readable code.

11. The system of claim 9 wherein the input means for reading a machine readable code and for providing code data from the machine readable code is a camera.

12. The system of claim 9 wherein the data request message comprises a URL.

* * * * *